United States Patent
Collins et al.

[11] Patent Number: 5,793,693
[45] Date of Patent: Aug. 11, 1998

[54] CACHE MEMORY USING UNIQUE BURST COUNTER CIRCUITRY AND ASYNCHRONOUS INTERLEAVED RAM BANKS FOR ZERO WAIT STATE OPERATION

[75] Inventors: Michael J. Collins, Tomball; Jeffrey C. Stevens, Spring; Guy E. McSwain, Cypress, all of Tex.

[73] Assignee: Compaq Computer Corporation, Houston, Tex.

[21] Appl. No.: 743,501

[22] Filed: Nov. 4, 1996

[51] Int. Cl.$^6$ .................................. G11C 13/00
[52] U.S. Cl. .................. 365/230.01; 365/230.08
[58] Field of Search .............. 365/230.01, 230.03, 365/230.08, 189.01, 189.04

[56] References Cited

U.S. PATENT DOCUMENTS 5,572,468  11/1996  Ishinabe et al. ............... 365/230.08

OTHER PUBLICATIONS

Sony® CXK78V5862GB-50/60/66, pp. 1-39 (Feb. 1995).
Intel® Pentium™ Processor User's Manual, vol. 1: Pentium Processor Data Book, pp. 6-9 through 6-16 (1994).
The Cache Memory Book, pp. 62-72 (1993).
Motorola Semiconductor Technical Data, pp. 4-10 through 4-19 (19).

Primary Examiner—Terrell W. Fears
Attorney, Agent, or Firm—Pravel, Hewitt, Kimball & Krieger

[57] ABSTRACT

A cache memory system utilizing asynchronous/synchronous burst counter circuitry which lessens the need for expensive, high speed data SRAM to achieve zero wait-state operation. The burst counter circuitry takes advantage of the fact that a read address is present on the address bus approximately one-halfway through the initial bus cycle (T1) during a burst read. Unlike synchronous prior art burst counters, burst counter circuitry according to the invention is configured to forward the address to asynchronous address decoders as soon as it is present, rather than waiting for the next rising edge of the processor clock. For accesses to the first cache line, the timing budget therefore includes the first complete clock cycle of a burst read (T2) plus an extra half-clock cycle from T1. The extra time is utilized to retrieve data from the data SRAM core for provision to the processor data bus at the end of the bus cycle T2. Subsequent accesses are controlled by the burst counter in a synchronous fashion that corresponds to a processor specific burst ordering scheme. Due in part to the interleaved nature of the data SRAM, subsequent burst accesses are allotted almost 2 full clock cycles per data access. Thus, the shortest time in which the data SRAM must respond to an access request is the initial one and one-half clock cycles. Slower and less expensive data SRAMs can therefore be used to provide a cache memory capable of zero wait state operation.

15 Claims, 6 Drawing Sheets

CACHE MEMORY USING UNIQUE BURST COUNTER CIRCUITRY AND ASYNCHRONOUS INTERLEAVED RAM BANKS FOR ZERO WAIT STATE OPERATION

BACKGROUND OF THE INVENTION

1. Field of the Invention

The invention relates to computer systems employing cache memory, and more particularly to an interleaved cache memory device that utilizes asynchronous/synchronous burst counter circuitry to provide zero wait state operation in burst mode.

2. Description of the Related Art

The field of microcomputer design has seen tremendous advances in the past decade. Today's computer systems include multiple busses, extremely wide data paths, huge addressing spaces, and processor bus speeds well over 50 MHz. In the course of improving these computer systems, designers of both the chips and the systems themselves have resorted to cache technology to more efficiently couple the higher speed processors with lower speed memory. These caches have evolved into multiple level caches, with both data and code caches in the microprocessor, and a second level (L2) cache coupling the microprocessor host bus to slower speed system memory.

If a microprocessor requests memory data that is not available by the current cycle's end, the microprocessor must wait additional cycles for that data to become available. These additional cycles known as wait states. The purpose of a cache is to eliminate wait states. The cache contains data that is frequently accessed by the microprocessor. A processor running at 50 MHz only has 20 nanoseconds (ns) per clock cycle, and only more expensive static random access memory (SRAM) can respond to memory operations in such a short time without requiring wait states. Main memory is usually implemented using less expensive dynamic random access memory (DRAM), which is slower and requires the processor to wait additional clock cycles for a response. By putting frequently accessed memory in the fast cache memory, the microprocessor can receive data from the cache instead of the slow DRAM during memory cycles. A cache thereby provides an intermediate source of faster memory, relatively smaller than main memory, that permits a processor to run with fewer wait states when the needed data is stored in the cache memory. In addition, when the processor is operating from cache memory, other bus masters can take advantage of the idle system bus. When requested data is not stored in the cache memory, a cache controller retrieves the data from main memory.

Cache design is well known to the computer arts, and includes a number of configurations. Two popular configurations are a direct mapped cache and a multiple-way cache. In a direct mapped cache, a certain portion of the memory address is stored in a cache tag RAM as a "tag". The tag is indicative of the block of main memory to which the data stored in the cache data SRAM corresponds. A second portion of the processor provided memory address, known as the index (also called a "set"), then addresses the cache data SRAM when the corresponding tag in the tag RAM matches a valid tag portion of the processor address bus. For example, assume a simple memory system using 16 bit addressing, providing 64 kilobytes of memory. Assume that the high speed cache data SRAM provides 8 kilobytes of high speed cache memory. The lower 8 bits of the memory address then act as an index into both the cache data SRAM and the cache tag RAM, while the top 8 address bits are then stored in the indexed location in the tag RAM. When the microprocessor seeks to access a certain memory location, the top 8 address bits are compared to the data stored in the indexed location of the tag RAM. If the tag matches those bits, then the indexed cache data memory location contains the data from main memory corresponding to the processor-provided memory address.

The preceding example illustrates a direct mapped cache. A problem with direct mapped caches is evidenced when two memory locations are accessed which are one cache "page" apart—i.e., they have the same index—they could only occupy the same location in the cache data SRAM. Thus, on alternating accesses to such locations, the cache must be updated from or to main memory, resulting in a cache "miss".

To provide for a greater "hit" percentage, designers implemented multi-way set-associative caches. Typical examples include two-way and four-way set-associative caches. In a two-way cache, each cache index has two corresponding cache data SRAM storage locations and two corresponding tags in the cache tag RAM. If one indexed "way" is already occupied by data corresponding to another tag, then the second way can be used to store and retrieve the main memory data. When yet a third location of main memory needs to be stored in the cache, various algorithms are used to determine in which way of the cache to replace the data.

In a multiple-way set-associative cache, the index portion of the asserted address is latched into both the cache data and tag RAMs. When the cache tag RAMs returns a signal(s) indicating a hit to one of the ways, the output enable of the appropriate bank of cache data SRAM is enabled. But when running at 50 MHz or above, even the act of enabling the output buffers of the appropriate way of the cache can require a wait state. Cache designers have therefore implemented way prediction algorithms based on which way of the cache was most recently used. When an address is strobed onto the processor host bus by the processor for a read operation, the way prediction algorithm predicts which way is needed and enables that way's cache output enable. This occurs even before other more complicated circuitry determines which, if any, way is actually hit, saving precious time in enabling the output of the cache data SRAM.

Although advances in cache design have become incremental in recent years, the savings of even a single wait state is important to improving computer system performance. Even though cache data SRAMs are inherently faster than the DRAMs used for main memory, the aforementioned increases in processor bus clock rates have had the effect of taking away much of the timing margin necessary for reliable cache operation. Prior architectural techniques that provide zero wait states at 25 and 33 MHZ, such as interleaved cache banks, have proven troublesome at 60 MHz and above. The goal of zero wait state read accesses at higher processor bus clock frequencies is made even more difficult when delays through the tag system are taken into account. Some RAM manufacturers have approached the problem by incorporating the burst counter and even the tag RAM on the same chip with the cache data SRAM, which relaxes the required access time by a few nanoseconds. Relatively fast SRAMs are still required, however.

With slower processor bus clock speeds, so-called flow-through burst SRAMs can be utilized. According to this topology, a memory address to be read is clocked into the data SRAM at the end of a first clock period (T1). In the next clock period (T2), data at the address in the SRAM core is retrieved and provided to the microprocessor through output buffers with enough timing margin to meet setup requirements. Flow through burst SRAMs have proven adequate for processor bus clock frequencies up to 50 MHZ, but become very expensive to manufacture for use at higher frequencies.

The increased processor bus clock frequencies have therefore resulted in considerable pressure on SRAM manufacturing technology. Consider, for example, a computer utilizing a 66 MHz processor bus clock frequency. The time between rising clock edges is 15 ns. Because the cache SRAM includes some control logic delays and must meet a processor bus data setup time requirement of around 4 to 5 ns, the cache RAM must have an access time of approximately 8 to 9 ns for zero wait state operation at 66 MHz. Although asynchronous SRAMs continue to benefit from advances in submicron CMOS and BiCMOS manufacturing technologies—which have produced devices capable of operating within the 8 to 9 ns range—supply and yield for these faster SRAMs is still very low, making them much more expensive and difficult to manufacture. The resulting price premiums associated with these devices may be prohibitively high for use in many consumer-oriented computer systems.

One solution involves relaxing timing requirements by adding a wait state and implementing the cache system using so-called pipelined burst SRAMs. Under this architecture, the read address is clocked into the burst SRAM at the end of the first clock period T1. During the second clock period T2, data is retrieved from the data SRAM. The data is not immediately provided to the microprocessor as was the case with flow-through burst SRAMs, however, and does not need to meet rigid set-up time requirements. Following assertion of a hit signal from the tag RAM system, the data is instead synchronously clocked out to the processor bus during the next (third) clock period.

In the pipeline architecture, rather than using the address present on the address bus for immediately subsequent read accesses, addressing of the data SRAM is controlled by a burst counter. While one set of data is being latched out to the microprocessor, the next set is concurrently being retrieved from the data SRAM. In this manner, no additional wait states are incurred for subsequent data accesses. Using burst accesses with address pipelining has the advantage of reducing the access time required of the data SRAM from approximately 9 ns to 15 ns with a 66 MHZ clock. Much cheaper and easier to manufacture memory can be therefore be used. However, these types of synchronous burst SRAMs operate under the requirement of an additional wait state that measurably reduces computer system performance.

SUMMARY OF THE INVENTION

Briefly, a cache memory according to the invention uses asynchronous/synchronous burst counter circuitry that obviates the need for high speed data SRAM and yet is capable of operating with zero wait states. The burst counter circuitry takes advantage of the fact that a read address is asynchronously present on the address bus approximately one-half way through the initial bus cycle T1. Unlike synchronous prior art burst counters, a burst counter according to the invention is configured to forward the address to asynchronous address decoders as soon as it is present, rather than waiting for the next rising edge of the processor clock. Thus, for the first data access the timing budget includes the complete clock cycle of T2 plus an extra half-clock cycle from T1. The extra time is utilized to retrieve data from the data SRAM core for provision to the data bus at the end of the second bus cycle T2. The data SRAM operates in an essentially asynchronous fashion during this initial data access.

In the preferred embodiment, the asynchronous data SRAM core is organized as an interleaved 4-way set associative cache. Following the initial data access, subsequent accesses are controlled by the burst counter in a synchronous fashion that corresponds to a processor specific burst ordering scheme. Due in part to the interleaved nature of the data SRAM, subsequent burst accesses are allotted almost 2 full clock cycles per data access. Thus, the shortest time in which the data SRAM must respond to an access request is the initial one and one-half clock cycles. Slower and less expensive data SRAMs can therefore be used to provide a cache memory capable of zero wait state operation.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
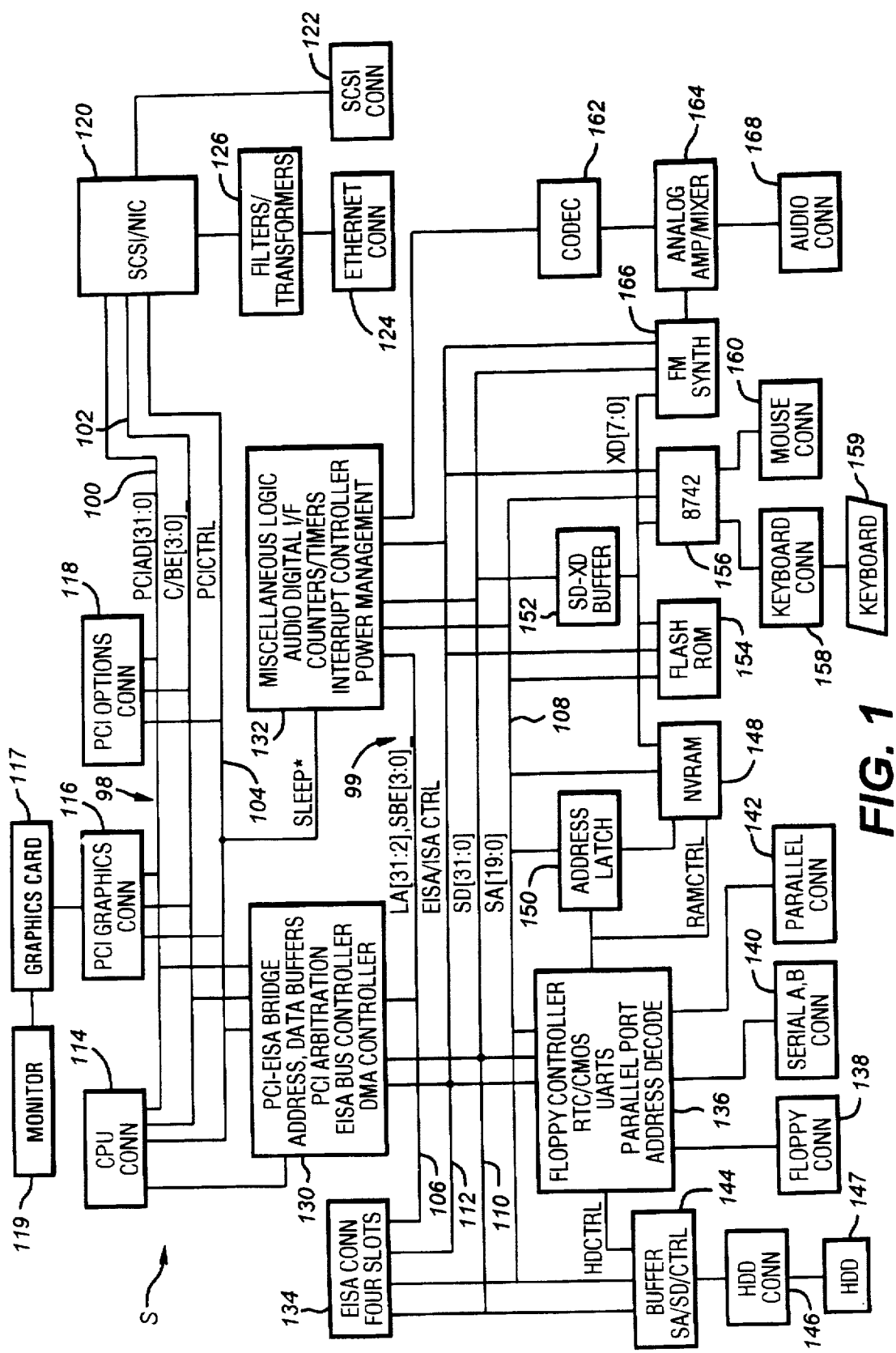
FIG. 1 is a block diagram of a system board of a computer system according to the preferred embodiment.

Turning now to the drawings, FIG. 1 shows the system board S of a computer system according to the present invention. The system board S contains circuitry and slots for receiving interchangeable circuit boards. In the preferred embodiment, there are two primary buses located on the system board S. The first bus is the PCI or Peripheral Component Interconnect bus P which includes an address/data portion 100, a control and byte enable portion 102 and a control signal portion 104. The second primary bus on the system board S is the EISA bus E. The EISA bus E includes LA address portion 106, SA address portion 108, SD data portion 110 and EISA/ISA control signal portion 112. The PCI and EISA buses P and E form the backbone of the system board S.

Figure 2:
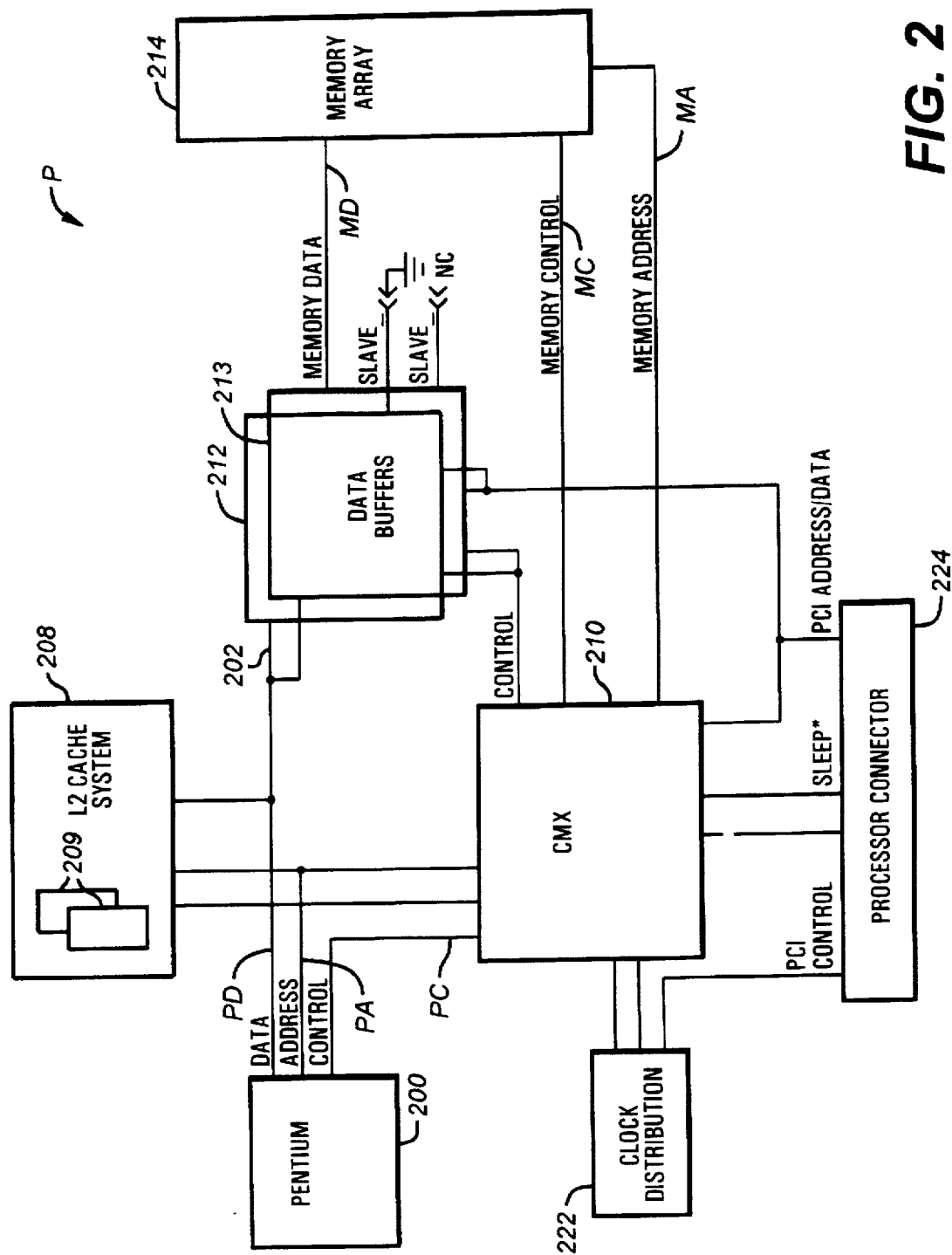
FIG. 2 is a block diagram of a processor board according to the present invention for use with the computer system of FIG. 1.

A CPU connector 114 is connected to the PCI bus 98 to receive a processor card, such as that shown in FIG. 2. A PCI graphics connector 116 is connected to the PCI bus 98 to receive a video graphics card 117. The graphics card provides video signals to an external monitor 119. A PCI option connector 118 is also connected to the PCI bus 98 to receive any additional cards designed according to the PCI standard. In addition, a SCSI and network interface (NIC) controller 120 is connected to the PCI bus 98. Preferably, the controller 120 is a single integrated circuit and includes the capabilities necessary to act as a PCI bus master and slave and the circuitry to act as a SCSI controller and an Ethernet interface. A SCSI connector 122 is connected to the controller 120 to allow connection of various SCSI devices, such as hard disk drives, CD-ROM drives, or other mass data storage devices (not shown). An Ethernet connector 124 is provided on the system board S and is connected to filter and transformer circuitry 126, which in turn is connected to the controller 120. This forms a network or Ethernet connection for connecting the system board S and computer to a local area network (LAN).

A PCI-EISA bridge 130 is provided to convert signals between the PCI bus 98 and the EISA bus 99. The PCI-EISA bridge 130 includes the necessary address and data buffers and latches, arbitration and bus master control logic for the PCI bus, EISA arbitration circuitry, an EISA bus controller as conventionally used in EISA systems and a DMA controller. Preferably the PCI-EISA bridge 130 is a single integrated circuit, but other combinations are possible. A miscellaneous system logic chip 132 is connected to the EISA bus 99. In the preferred embodiment, the miscellaneous system logic chip 132 is implemented as an application specific integrated circuit (ASIC). The miscellaneous system logic chip 132 contains a digital audio interface, counters and timers as conventionally present in personal computer systems, an interrupt controller for both the PCI and EISA buses 98 and 99 and power management logic, as well as other miscellaneous circuitry.

A series of four EISA slots 134 are connected to the EISA bus 99 to receive ISA and EISA adapter cards. A combination I/O chip 136 is connected to the EISA bus 99. The combination I/O chip 136 preferably includes a floppy disk controller, real time clock (RTC)/CMOS memory, two UARTs, a parallel port and various address decode logic. A floppy disk connector 138 for receiving a cable to a floppy disk drive is connected to the combination I/O chip 136. A pair of serial port connectors are also connected to the combination I/O chip 136, as is a parallel port connector 142. A buffer 144 is connected to both the EISA bus 99 and the combination I/O chip 136 to act as a buffer between the EISA bus 99 and a hard disk drive connector 146 to allow connection of an IDE-type hard disk drive 147 or other mass data storage device. A non-volatile random access memory (NVRAM) 148 is connected to the EISA bus 99 and receives its control signals from the combination I/O chip 136. An address latch 150 is connected to the EISA bus 99 and controlled by the combination I/O chip 136 to provide additional addressing capability for the NVRAM 148. Preferably the NVRAM 148 is used to contain certain system information.

A data buffer 152 is connected to the SD portion of the EISA bus 99 to provide an additional data bus XD for various additional components of the computer system. The NVRAM 148 is connected to the XD data bus to receive its data bits. A flash ROM 154 receives its control and address signals from the EISA bus 99 and is connected to the XD bus for data transfer. Preferably, the flash ROM 154 contains the BIOS information for the computer system and can be reprogrammed to allow for revisions of the BIOS. An 8742 or keyboard controller 156 is connected to the XD bus and EISA address and control portions 108 and 112. The keyboard controller 156 is of conventional design and is connected in turn to a keyboard connector 158 for receiving a keyboard 159, and a mouse or pointing device connector 160.

The computer system of the preferred embodiment also includes audio capabilities. To this end a CODEC chip 162 is connected to the miscellaneous system logic chip 132 and to an analog amplifier and mixer chip 164. An FM synthesizer chip 166 is connected to the analog amplifier and mixer 164 and receives digital information from the XD bus. The FM synthesizer 166 is also connected to the control and data portions 110 and 112 of the EISA bus 99 and is controlled by the miscellaneous system logic chip 132. An audio connector 168 is provided to allow external audio connections to the computer and is connected to the outputs and inputs of the analog amplifier and mixer 164.

Referring now to FIG. 2, a processor board P for use with the system board S is shown. In the processor board P, the CPU or microprocessor 200 is preferably the 64-bit Pentium® P54 processor from Intel®, versions of which operate at numerous internal clock frequencies. The microprocessor 200 can also be a 32-bit Pentium® P24 processor or a 486 DX4 processor, also from Intel®. Other similar processors may be utilized. The microprocessor 200 is connected to a processor bus 202 having data, address and control portions PD, PA and PC. When used with the Pentium® P54 processor, the width of the data bus PD is 64 bits. With the Pentium® P24 processor or the 486 DX4 processor, the width of the bus PD is 32 bits.

The microprocessor 200 includes an internal or L1 cache memory. A level 2 (L2) or external cache memory system 208 is connected to the processor bus 202 to provide additional caching capabilities to improve performance of the computer system. A processor cache and memory controller (CMX) and PCI bridge chip 210 is connected to the control portion PC and to the address portion PA. The CMX 210 receives the signal SLEEP* provided by the miscellaneous logic chip 132 to place the microprocessor 200 into low power mode. The CMX 210 also controls data buffers 212 and 213. Additionally, the CMX 210 provides control signals MC and address signals MA to a main memory 214. The control signals MC include various RAS* and CAS* signals. The CMX 210 is also connected to the L2 cache system 208, as it incorporates the cache controller, and therefore, controls the operations of cache memory devices 209 in the L2 cache system 208. The cache memory devices 209 are implemented with static random access memories (SRAMs). For the 32-bit processors, cache memory sizes of 128K or 256K bytes are supported, with the cache line width being 16 bytes. For the 64-bit processors, cache sizes of 256K and 512K bytes are supported, with the cache line width being 32 bytes. Note that certain signals in the computer system S are physically manifested as active low signals. That is, when the physical signal is at a logic low level, it is considered true. Such signals are generally designated by being followed with an asterisk "*", or a pound sign, "#".

The CMX 210 also supports either asynchronous (standard) or synchronous (burst) SRAMs as the cache data SRAMs. When the microprocessor 200 is implemented with one of the Pentium® processors, burst SRAMs 209 are used to enable operation at 50 MHz, 60 MHz or 66 MHz. As described more fully below in conjunction with FIG. 4, a burst SRAM 209 according to the invention includes a 2-bit counter for incrementing burst addresses during a burst cycle.

Every memory read and write operation undertaken by the microprocessor 200 is examined to determine whether the cycle is addressing a location currently allocated inside an SRAM 209. If the read or write request can be satisfied completely within the SRAM 209 and there is no need to broadcast the cycle to the rest of the computer system, the SRAM 209 completes the cycle with the microprocessor 200. The CMX 210 is configured to execute all cycles which the cache memory system 208 cannot complete. These cycles include all I/O cycles, all special cycles and cache miss cycles, and certain hit cycles which require the cycle to be run in rest of the computer system.

The L2 cache memory system 208 supports both the writethrough and writeback cache consistency protocols. If the writethrough protocol is used, all writes to the L2 cache memory 208 are written back to main memory 214 to maintain coherency between the L2 cache 208 and main memory 214. The writeback cache uses the MESI (Modified/Exclusive/Shared/Invalid) protocol, as is well known in the art. The L2 cache memory 208 write policy is determined by the state of a bit in a configuration register. When set, this bit indicates a writeback policy; if cleared, a writethrough policy is implemented. Configuration cycles are provided for on the PCI bus 98 to allow for software driven initialization and configuration of PCI bus devices in a separate address space. For more information on PCI configuration cycles, refer to the PCI Specification 2.1 from the PCI Special Interest Group in care of Intel® Corporation, which is hereby incorporated by reference.

The data buffers 212 and 213, which are preferably implemented with ASICs, are connected between the processor data bus PD and the memory data bus MD provided by the memory array 214. The data buffers 212 and 213 are also connected to the PCI address and data bus PCIAD through a connector 224, which is provided to be mateably received by the processor connector 114. The data buffers 212 and 213 are connected to various control signals from the CMX 210.

The data buffers 212 and 213 each include a SLAVE__ input. As shown, the SLAVE__input to the data buffer 212 is tied to ground and the SLAVE__input of the data buffer 213 is not connected, the input being pulled high by an internal pull-up resistor. The data buffer 212 is referred to as the slave data buffer, and the data buffer 213 is referred to as the master data buffer. Each data buffer receives half the data bits from the processor, memory and PCI data buses PD, MD, and PCIAD, respectively.

Figure 3:
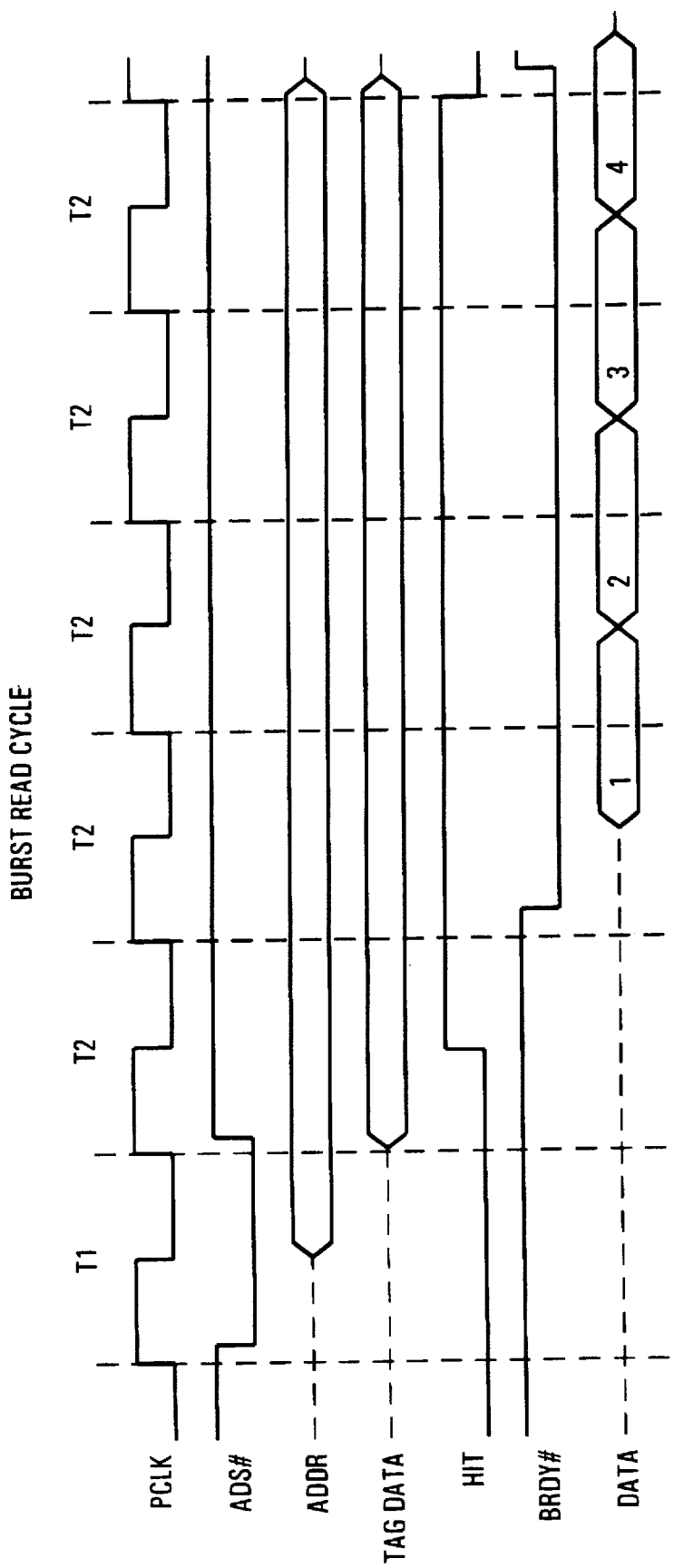
FIG. 3 is a timing diagram illustrating a burst read cycle according to the prior art.

Clock distribution and generation circuitry 222 is associated with the processor card P and is connected to the CMX 210. The clock distribution circuitry 222 provides a clock CLK to the processor bus 202. The processor connector 224 is connected to the CMX 210 and the clock distribution circuitry 222 to provide clocks to the computer system and to provide a PCI interface to allow the microprocessor 200 to access the PCI and EISA buses 98 and 99 and to allow PCI and EISA bus masters to access the main memory array 214. The PCI address and data are multiplexed on the bus PCIAD, with the address provided during the address phase and data provided during the data phase. Referring now to FIG. 3, a timing diagram illustrating a one-wait state burst read cycle according to the prior art is shown. In a typical burst read cycle, the address strobe signal ADS# is first driven low by the microprocessor 200 to indicate the beginning of a bus cycle. The initial clock cycle is referred to as a "T1" clock cycle while subsequent cycles up to the completion of the read access are referred to as "T2" clock cycles. The index portion of the asserted address, which is valid approximately half way through the first clock cycle T1, is latched into the burst data SRAM at the end of T1. If the tag RAM determines that a valid copy of the requested data is stored in the burst data SRAM, the cache hit signal HIT is asserted at some point during the first T2 clock cycle.

Immediately following assertion of the cache hit signal HIT, retrieval of the requested data from the burst data SRAM commences. The data, however, is not immediately provided to the microprocessor 200. Instead, a wait state is inserted such that the data access time required of the burst data SRAM is extended. When the data access is complete and valid data has been placed on the processor bus PD, the cache memory system 208 asserts the burst ready signal BRDY# (typically during the second T2 clock cycle). Data is then latched into the microprocessor 200 during the next rising edge of the processor clock PCLK, which is typically at the end of the second T2 clock cycle.

In the described architecture, rather than using the address present on the address bus for immediately subsequent read accesses, addressing of the burst data SRAM is controlled by a burst counter. While one set of data is being latched out to the microprocessor, the next set is concurrently retrieved from the data SRAM. In this manner, no additional wait states are incurred for subsequent data accesses. Using burst accesses with one wait state has the advantage of reducing the access time required of the data SRAM from approximately 9 ns to approximately 15 ns with a 66 MHZ clock. Much cheaper and easier to manufacture memory can therefore be utilized. As mentioned, however, requiring wait states during memory accesses—even one wait state—can measurably degrade computer system performance.

Figure 4:
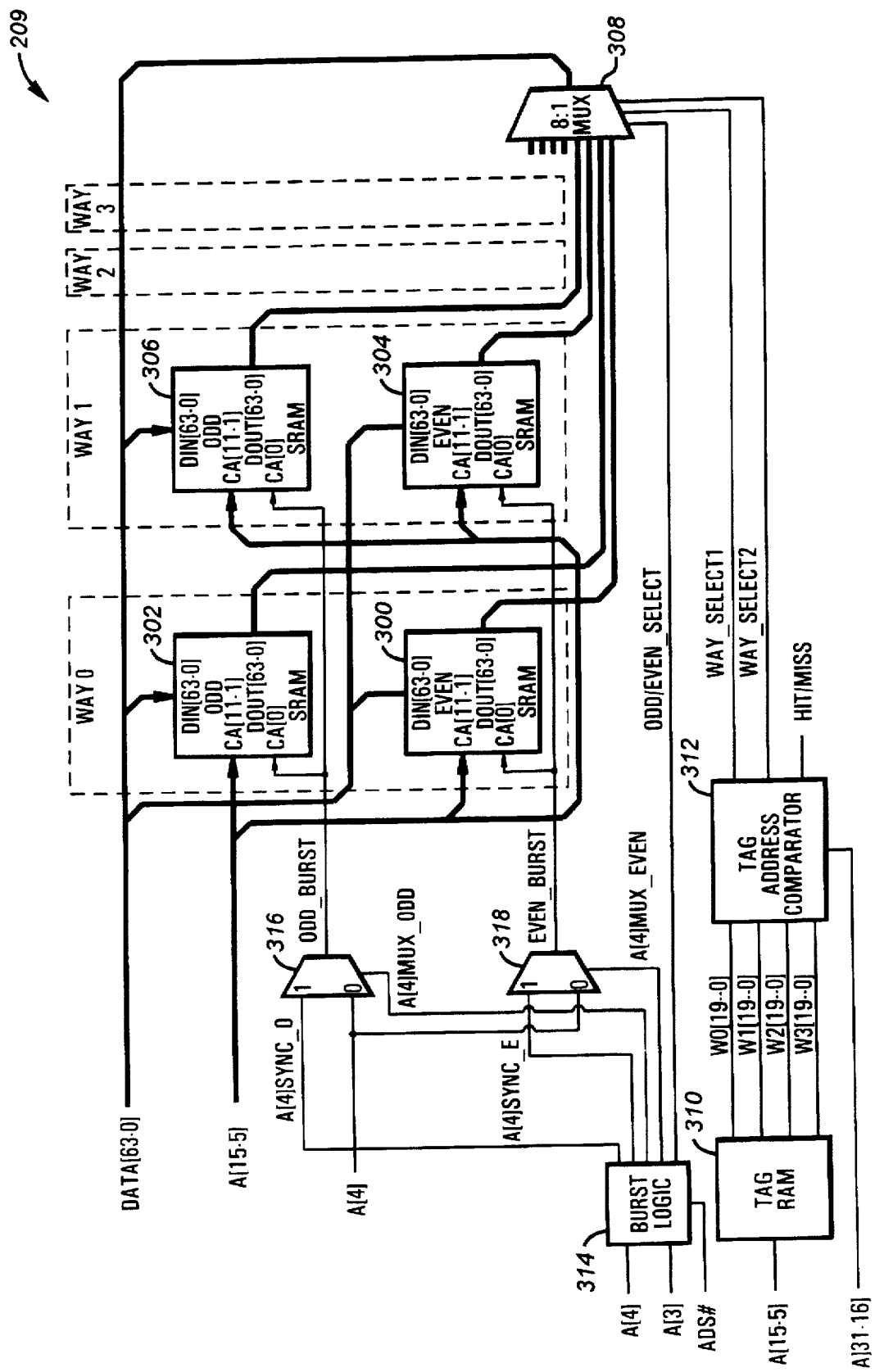
FIG. 4 is a schematic block diagram illustrating an interleaved four-way cache implemented according to the invention.

Referring now to FIG. 4, a schematic block diagram illustrating a cache SRAM 209 of the cache memory system 208 implemented according to the invention is shown. In the preferred embodiment, the SRAM 209 is organized as an interleaved 4-way set associative single-chip 128K bytes (4×4K×64) secondary data cache, where the capacity is given according to the formula: ways×sets×cache line size (in bits). The 128K byte SRAM 209 is cascadable to 256K bytes, 4-way set associative providing zero-wait state read and write cache hit cycles at 50, 60 and 66 MHz. The four ways of the SRAM 209 are denoted as WAY 0, WAY 1, WAY 2 and WAY 3 and hereinafter collectively referred to as "ways". The disclosed SRAM 209 also incorporates an on-board tag RAM 310 (4×512×20).

Alternatively, the cache memory system 208 can be organized as one or two single-chip, 256K bytes interleaved 4-way set associative (4×8K×64) data SRAMs 209 incorporating an on-board tag RAM 310 of 4×1K×19. Many other L2 cache system 208 configurations are also possible, and it is understood that the exact sizes of the various memory arrays are not critical to the invention. Although not shown for sake of clarity, the SRAM 209 preferably incorporates a 3.3V input/output (I/O) interface, control logic, boundary scan testing support and a low power standby mode with data retention.

The ways of the L2 cache memory system 208 (as well as the main memory array 214) are organized into even and odd banks of memory, with each bank holding as many bits per location as the number of data wires in the processor data bus PD. For a system based on the 386DX or 486 processors from Intel Corporation, the bank width is usually 32 bits. For a Pentium®-based system the bank width is usually 64 bits, or 72 bits when parity bits or Error Correcting Code (ECC) bits are counted. Throughout the remainder of this specification, the bank width is assumed to be 64 bits. In the disclosed embodiment of the invention, WAY 0 is comprised of EVEN and ODD memory banks 300 and 302, while WAY 1 is comprised of EVEN and ODD memory banks 304 and 306. Preferably, each of the memory banks 300, 302, 304, 306 incorporate asynchronous address decoders. The identically configured memory banks of WAY 3 and WAY 4 are not shown for sake of clarity.

Interleaved memory access refers to the practice of arranging memory arrays or chips such that all the even addresses are in one bank of memory (or group of banks) and all of the odd addresses are in another. The L2 cache memory system 208 must therefore have an even number of banks of memory in order to use interleaved memory access. As discussed more fully below in conjunction with FIG. 5, memory addresses can then be alternated between the even bank(s) and the odd bank(s) such that memory accessed in order of location in memory address space is accessed alternately from an even bank and from an odd bank.

The DIN[63-0] bits of each of the memory banks 300, 302, 304 and 306 of the SRAM 209 are coupled to the DATA[63-0] bits of the processor data bus PD for receiving cacheable write data. In addition, the DOUT[63-0] outputs of each of the memory banks 300, 302, 304 and 306 are individually provided to inputs of an 8:1 multiplexor 308 that selectively couples cache line data to the processor data bus PD during read cycles. Further, the A[15-5] bits of the processor address bus are coupled to the CA[11-1] inputs of each of the memory banks 300, 302, 304 and 306.

To detect if data addressed by the microprocessor 200 (or various PCI bus masters) during a memory cycle is located in the L2 cache memory system 208, each SRAM 209 includes a tag RAM 310. The high speed tag RAM 310 cooperates with a tag address comparator 312 that permits quick determination of hits to data blocks inside the ways. Depending on the size and associativity of the L2 cache memory system 208, portions of processor address bus PA are used to index to a cache line in each tag RAM 310.

In the embodiment of FIG. 4, for example, processor address bits A[15:5] are received by the tag RAM 310 and are used to index an entry in each way. Each index entry (also referred to as a "tag address") in each of the four ways of the tag RAM 310 generally contains a label and at least two state bits for each stored line in the data cache. As is known in the art, the state bits may be utilized to implement the MESI protocol, which is used to maintain cache data consistency in multi-cache systems. Additional state bits could be stored to implement other protocols. Further, the depth of the tag RAM 310 can be reduced by a factor of two by using one of the tag address bits (preferably A[5]) as a line select bit. One tag address then corresponds to two cache data lines. This technique is often referred to as "sectoring", and can be used with additional bits in a tag address to further reduce the required depth of the tag RAM 310.

In the disclosed configuration the label is comprised of the remaining address bits, which correspond to stored cache data entries. Although the labels shown are comprised of the 16 most significant bits of the address bus A[31-16], it is recognized that fewer bits could be used if the computer system S does not utilize all of the available address space. When a cacheable read cycle is initiated, the tag RAM 310 provides the indexed label for each way to the tag address comparator 312. These labels and four associated state bits are communicated over signal lines W0[19-0], W1 [19-0], W2[19-0] and W3 [19-0] as shown in FIG. 4.

The tag address comparator 312 then compares the labels to the current processor address bits A[31:16] to determine if a match occurs. If the labels match, the state bits corresponding to the selected line are examined to determine the state of the cache line. If the state bits indicate a valid cache data entry, a cache "hit" is indicated by assertion of a cache hit signal HIT/MISS, which is provided to cache control logic (not shown). Way select signals WAY_SELECT1 and WAY_SELECT2 are also provided from the tag address comparator 312 to two of the control inputs of the 8:1 multiplexor 308 that connects the data memory array outputs to the processor data bus PD. The way select signals WAY_SELECT1 and WAY_SELECT2 are asserted to enable the outputs of the way that contains the requested quad-word of data.

Most of today's processors are configured to complete all cacheable read cycles in burst mode. With the extension of the data bus to 64 bits, a typical burst cycle transfers 32 bytes in four bus cycles of 8 bytes (64 bits) each. These bytes are contiguous, and are aligned to 32 byte boundaries corresponding to cache lines of the on-chip L1 caches. Because a burst cycle is limited to an address area which begins at a 32-byte boundary, the three other burst addresses are also implicitly known. Burst logic 314 is therefore provided to independently calculate the other three burst addresses—obviating the need to decode further address signals from the microprocessor 200 and incur additional wait states. With the Pentium® processor, the address sequence in burst mode is fixed dependent on the first address. This is necessary because the first address given out by the Pentium® need not necessarily define a 32-byte boundary; it can lie anywhere in the address space and generally defines the line most immediately needed by the processor. The fixed address sequences supported by the Pentium® processor are described more fully below in conjunction with FIG. 5, and are also described in the Intel Pentium® Processor User's Manual, Volume 1 1994, pp. 6–13 through 6–16, which is incorporated by reference. In general, burst ordering is defined in a Pentium® processor to satisfy a number of requirements. First, the initial addressed quad-word is read/written. Second, the second addressed quad-word is to the same low order bit address (i.e., A[4] remains the same), but to the opposite odd/even bank. Third, each successive quad-word is read/written to alternating odd/even banks. This choice of burst ordering simplifies the burst logic for interleaved memory accesses.

In order to determine the required address sequence, burst logic 314 is provided with processor address bits A[4] and A[3] and an address strobe signal ADS#. In particular, address bit A[4] identifies the initial quad-word that is addressed, while address bit A[3] specifies whether the initial quad-word is in the even bank or the odd bank. The burst logic 314 communicates an addressing signal A[4] SYNC_0 to the "1" input of a first 2:1 multiplexor 316 and an addressing signal A[4]SYNC_E to the "1" of a second 2:1 multiplexor 318. The burst logic 314 also provides an odd or even bank select signal ODD/EVEN_SELECT to the one of the control inputs of the 8:1 multiplexor 308. The select input of the multiplexor 318 is driven by a multiplexor control output signal A[4]MUX_EVEN signal supplied by the burst logic 314. Similarly, the select input of the multiplexor 316 is driven by a multiplexor control output signal A[4]MUX_ODD from the burst logic 314. The "0" input of each of the multiplexors 316 and 318 is coupled to the processor address bit A[4].

The output of the first 2:1 multiplexor 316 communicates a cache line select signal ODD_BURST to the low-order address inputs CA[0] of the odd memory banks 302 and 306, while the output of the second 2:1 multiplexor 318 communicates a cache line select signal EVEN_BURST to the low-order address inputs CA[0] or the even memory banks 300 and 304. As described immediately below, during the first clock cycle T1 of a burst read cycle the multiplexors 316 and 318 and the burst logic 314 cooperate to drive the initial low-order address input CA[0] of each bank of memory asynchronously, but to then drive that input synchronously during subsequent clock cycles T2.

Figure 5:
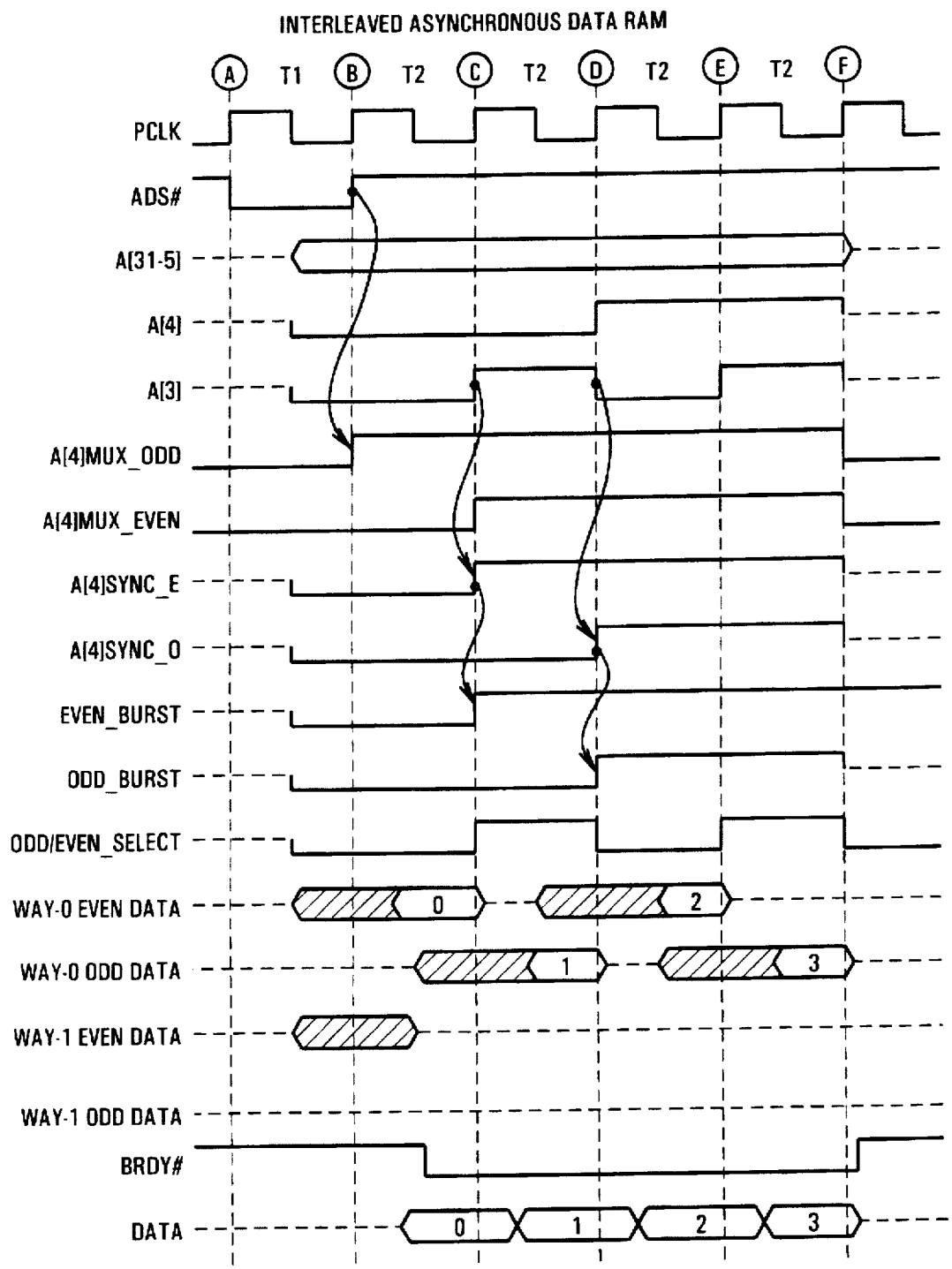
FIGS. 5 and 6 are timing diagrams illustrating a burst read cycle according to the invention.

Referring now to FIG. 5, a timing diagram illustrating a burst read cycle according to the invention is shown. In prior art synchronous or burst SRAMs, burst cycles are initiated by asserting the address strobe signal ADS* during the initial clock cycle T1 beginning at time A. The initial burst address is typically strobed into the SRAM at the rising edge of the address strobe signal ADS* at time B. The address strobe signal ADS* is normally asserted by either the microprocessor 200 or the CMX 210. Typical asynchronous SRAMS, on the other hand, do not include an address strobe input. Instead, they have an address latch input for latching in the external address.

In an asynchronous SRAM 209 according to the invention, the initial burst address is not strobed into the memory banks 300, 302, 304 and 306 in a synchronous fashion. At some point between time A and time B, the initial burst address becomes valid. During this T1 clock cycle, the burst logic 314 maintains the multiplexor control output signals A[4]MUX_EVEN and A[4]MUX_ODD at logic low levels, such that the "0" inputs to the multiplexors 316 and 318 (i.e. the A[4] address bit) are provided to the CA[0] inputs of the memory banks 300, 302, 304 and 306 in an asynchronous fashion. In this manner, the memory arrays begin accessing the addressed data as soon as the read address is present, without waiting for the rising edge of the address strobe signal ADS#.

Figure 6:
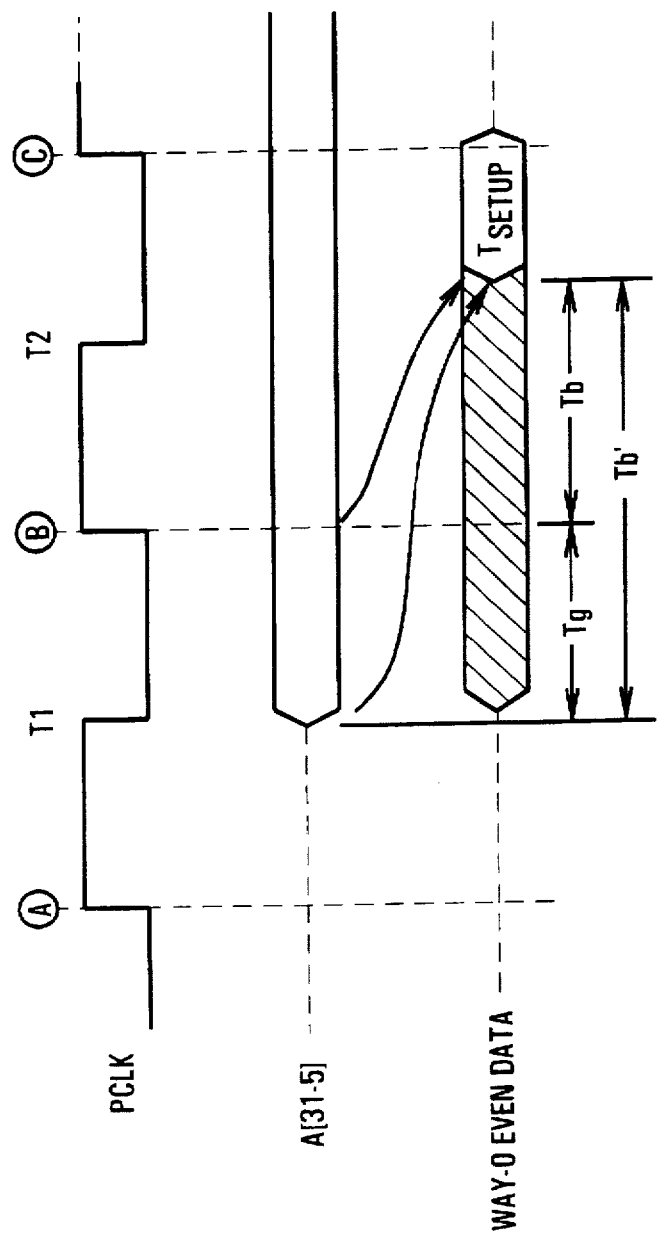

A detailed view of relevant timing relationships is shown in FIG. 6. Referring briefly to that figure, the time between assertion of a valid address on the processor address bus PA and the next rising edge of the processor clock PCLK is show as "Tg." The amount of time required to satisfy the data setup and hold time requirements of an SRAM 209 is illustrated as "Tsetup." In a fully synchronous burst memory system, the address is not available for decoding by the cache memory until time B, resulting in an address-to-data access timing budget of "Tb". In an asynchronous initial data access according to the invention, however, the time Tg is added to the address-to-data access timing budget, resulting in a lengthened interval Tb'. Many nanoseconds of timing margin are thereby added to the address-to-data-access timing budget Tb' for the first quad-word of data. Because timing constraints are tightest during this initial access, slower and cheaper memory can be used for zero wait-state operation.

Returning to FIG. 5, at time B the rising edge of the address strobe signal ADS# triggers "synchronous" operation of the SRAM 209. The multiplexor control signal A[4]MUX_ODD provided by the burst logic 314 is asserted at this point, such that the "1" input to the multiplexor 316 is provided to the CA[0] inputs of the memory banks 302 and 306. Stated another way, the addressing signal A[4]SYNC_0 becomes the cache line select signal ODD_BURST. Addressing of subsequent odd quad-words of data can thereby be controlled in a "synchronous" fashion by the burst logic 314.

The multiplexor control signal A[4]MUX_EVEN is not asserted until time C in the disclosed embodiment. While A[4]MUX_EVEN is asserted, the addressing signal A[4]SYNC_E is provided by the multiplexor 318 to the CA[0] inputs of the memory banks 300 and 304. If A[4]MUX_EVEN is asserted prior to the first quad-word of data being provided to the processor data bus PD, the potential exists for a switching glitch at the output of the multiplexor 318 to be seen at the CA[0] input of the even memory banks. Delaying the assertion of A[4]MUX_EVEN until time C does not negatively impact cache performance, as the memory array 300 is still allowed almost two full processor clock PCLK cycles to access the next even quad-word. In the event that the first addressed quad-word is stored in an odd memory bank, A[4]MUX_EVEN is asserted at time B while A[4]MUX_ODD is not asserted until time C.

As mentioned, a burst read access can begin at any one of four quad-word addresses. The following table provides exemplary addressing:

|         | EVEN QUAD-WORD 0 | ODD QUAD-WORD 1 | EVEN QUAD-WORD 2 | ODD QUAD-WORD 3 |
|---------|------------------|-----------------|------------------|-----------------|
| ADDR[4] | 0                | 0               | 1                | 1               |
| ADDR[3] | 0                | 1               | 0                | 1               |

After the initial burst address is registered, the three subsequent addresses are generated by the burst logic 314. The subsequent address are incremented according to a burst ordering scheme shown in one of the two following tables:

| FIRST | SECOND | THIRD | FOURTH |
|-------|--------|-------|--------|
| (Pentium ® Burst Sequence) | | | |
| 0 | 1 | 2 | 3 |
| 1 | 0 | 3 | 2 |
| 2 | 3 | 0 | 1 |
| 3 | 2 | 1 | 0 |
| or, | | | |
| (Linear Burst Sequence) | | | |
| 0 | 1 | 2 | 3 |
| 1 | 2 | 3 | 0 |
| 2 | 3 | 0 | 1 |
| 3 | 0 | 1 | 2 |

Note that in both the Pentium Burst Sequence and the Linear Burst Sequence, data is accessed alternately from an even bank and from an odd bank, although the control logic is slightly more complicated for the Linear Burst Sequence.

In a burst sequence according to FIG. 5, even quad-word 0 of WAY 0 is the first quad-word provided to the processor data bus PD. The data setup and hold time Tsetup required of the SRAM 209 is typically in the 4–5 ns range. Even quad-word 0 must therefore be valid at least –4 ns before the rising edge of the processor clock PCLK at time C. Shortly after quad-word 0 is clocked out to the processor data bus PD at time C, the addressing signal A[4]SYNC_E is asserted so that the memory bank 300 can begin accessing the even quad-word 2. Quad-word 2 is not provided to the processor address bus until time E, thus the memory array 300 is allowed two full processor clock PCLK cycles—minus the data setup and hold time Tsetup—to respond. In similar fashion, the addressing signal A[4]SYNC_O is held at a logic low level until quad-word 1 is clocked out to the processor data bus PD at time D, and is asserted immediately thereafter. Zero-wait state operation is thus maintained throughout the burst read cycle.

At time C, the odd or even bank select signal ODD/EVEN_SELECT transitions such that the output of the odd memory bank 302 is provided to the processor data bus PD by the 8:1 multiplexor 308 on the next rising edge of the processor clock PCLK. The bank select signal ODD/EVEN_SELECT transitions in a similar manner at times D and E for quad-words 2 and 3.

As shown in FIG. 5, both WAY 0 even memory bank 300 and WAY 1 even memory bank 304 are enabled during the initial clock cycle T1 by address bit A[4]. Both of the memory banks remain powered on until a way is selected by the tag address comparator 312. Assuming that WAY 0 is selected, the other three ways can be disabled to conserve power.

According to the invention, the burst ready signal BRDY* is asserted at some point between time B and time C to indicate the beginning of a burst cycle. The signal BRDY* is then deasserted following completion of the burst cycle at time F. For the Pentium® P54 processor, the signal BRDY* is used to indicate completion of all bus cycles. However, for the 486 DX4 or Pentium® P24 processors, the signal BRDY* indicates the completion of a burst cycle and the signal RDY* (not shown) indicates the completion of non-burst cycles.

Thus, a cache memory has been described that utilizes unique burst counter circuitry which lessens the need for expensive, high speed data SRAM to achieve zero wait-state operation. The burst counter circuitry takes advantage of the fact that a read address is present on the address bus approximately one-half way through the initial bus cycle T1. Unlike synchronous prior art burst counters, burst counter circuitry according to the invention is configured to forward the address to asynchronous address decoders as soon as it is present, rather than waiting for the next rising edge of the processor clock. For accesses to the first data quad-word, the timing budget therefore includes the first complete clock cycle of a burst read (T2) plus an extra half-clock cycle from T1. The extra time is utilized to retrieve data from the data SRAM core for provision to the data bus at the end of the second bus cycle T2. Subsequent accesses are controlled by the burst counter in a synchronous fashion that corresponds to a processor specific burst ordering scheme.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. An interleaved cache memory system for use in a computer having an address bus and a data bus for carrying burst accesses with an initial address and multiple data items and a processor clock, the cache memory system providing zero wait-state burst access to stored data following commencement of a read cycle, comprising:

an array of asynchronous memory having address inputs and forming a cache address space, said array of memory partitioned into an even memory bank and an odd memory bank for storing data corresponding to even and odd addresses provided to the address inputs;

burst logic for generating a first address signal for provision to a first address input of said even memory bank and a second address signal for provision to a second address input of said odd memory bank, said first and second address signals, in conjunction with additional address signals provided by an address bus, specifying a particular cache data item within said even memory bank and said odd memory bank, respectively; and control circuitry coupled to said burst logic, said address inputs of said even memory bank and said odd memory bank, and at least one signal on the address bus, wherein said control circuitry asynchronously passes the at least one signal from the address bus to at least one of said first and second address inputs of said even memory bank and said odd memory bank when the initial address is provided for the burst access, and wherein said control circuitry provides said first and second address signals to said first and second address inputs of said even and odd memory banks, respectively, synchronous with the processor clock for the remainder of the burst access.

2. The cache memory system of claim 1, further comprising additional arrays of memory partitioned into equal numbers of additional even memory banks and additional odd memory banks, wherein the address inputs to each of said even memory banks are essentially identical and wherein the address inputs to each of said odd memory banks are essentially identical.

3. The cache memory system of claim 2, further comprising:

a tag memory coupled to the address bus for storing labels corresponding to the contents of each of said memory arrays;

a tag address comparator, coupled to the address bus and said tag memory, for comparing stored labels to specified address bits of the address bus to determine which, if any, of said memory arrays contains data corresponding to a given address, said tag address comparator providing at least one memory array select signal based on the comparison; and output multiplexor circuitry having inputs individually coupled to the outputs of each of said even and odd memory banks, said output multiplexor circuitry providing one of the memory bank outputs to a processor data bus based upon said at least one memory array select signal and a memory bank select signal provided by said burst logic.

4. The cache memory system of claim 2, having a total of four even memory banks and a total of four odd memory banks.

5. The cache memory system of claim 1, wherein said burst logic generates said first address signal and said second address signal in accordance with a predetermined burst ordering scheme.

6. The cache memory system of claim 5, wherein said predetermined burst ordering scheme is a Pentium® burst sequence.

7. The cache memory system of claim 5, wherein said predetermined burst ordering scheme is a linear burst sequence.

8. A computer system, comprising:

a processor;

a processor bus coupled to said processor having address and data portions for carrying burst accesses with an initial address and multiple data items and a processor clock;

a memory controller coupled to the processor bus and further coupled to a system bus;

a main memory device coupled to said processor bus and said memory controller;

a mass data storage device coupled to said system bus for providing data to said processor and said main memory device; and an interleaved cache memory system coupled to the processor bus for providing said processor with an intermediate source of frequently accessed data stored in said main memory, said cache memory system providing zero wait-state burst access to the duplicated data following commencement of a burst read cycle, said cache memory system comprising:

an array of asynchronous memory having address inputs and forming a cache address space, said array of memory partitioned into an even memory bank and an odd memory bank for storing cache data corresponding to even and odd addresses provided to the address inputs;

burst logic for generating a first address signal for provision to a first address input of said even memory bank and a second address signal for provision to a second address input of said odd memory bank, said first and second address signals, in conjunction with additional address signals provided by said processor address bus, specifying a particular cache data item within said even memory bank and said odd memory bank, respectively; and control circuitry coupled to said burst logic, said address inputs of said even memory bank and said odd memory bank, and at least one signal on said address bus, wherein said control circuitry asynchronously passes the at least one signal from the address bus to at least one of said first and second address inputs of said even memory bank and said odd memory bank when the initial address is provided for the burst access, and wherein said control circuitry provides said first and second address signals to said first and second address inputs of said even and odd memory banks, respectively, synchronous with the processor clock for the remainder of the burst access.

9. The computer system of claim 8, wherein said cache memory system further comprises additional arrays of memory partitioned into equal numbers of additional even memory banks and additional odd memory banks, and wherein the address inputs to each of said even memory banks are essentially identical and the address inputs to each of said odd memory banks are essentially identical.

10. The computer system of claim 9, wherein the cache memory system further comprises:

a tag memory coupled to the processor address bus for storing labels corresponding to the contents of each of said memory arrays;

a tag address comparator, coupled to the processor address bus and said tag memory, for comparing stored labels to specified address bits of the processor address bus to determine which, if any, of said memory arrays contains data corresponding to a given address, said tag address comparator providing at least one memory array select signal based on the comparison; and output multiplexor circuitry having inputs individually coupled to the outputs of each of said even and odd memory banks, said output multiplexor circuitry providing one of the memory bank outputs to the processor data bus based upon said at least one memory array select signal and a memory bank select signal provided by said burst logic.

11. Cache control logic for use in an interleaved cache memory system, the cache control logic enabling zero wait-state burst access to stored data following commencement of a burst read cycle, comprising:

burst logic for generating a first address signal for provision to a first address input of an even memory bank and a second address signal for provision to a second address input of an odd memory bank; and control circuitry coupled to said burst logic and capable of coupling to at least one signal of an address bus, wherein said control circuitry asynchronously passes the at least one signal from the address bus to at least one of the first and second address inputs of an even memory bank or an odd memory bank when the initial address is provided for the burst access, and wherein said control circuitry provides said first and second address signals to the first and second address inputs of the even and odd memory banks, respectively, synchronous with a processor clock for the remainder of the burst access.

12. The cache control logic of claim 11, further comprising:

a tag memory capable of coupling to an address bus for storing labels corresponding to the contents of memory arrays;

a tag address comparator, coupled to said tag memory and capable of coupling to an address bus, for comparing stored labels to specified address bits of an address bus to determine which, if any, of a plurality of memory arrays contains data corresponding to a given address, said tag address comparator providing at least one memory array select signal based on the comparison.

13. A method for achieving zero wait-state burst read cycles having first and subsequent burst addresses in an interleaved cache memory system, the method comprising the steps of:

asynchronously providing the first address of a burst read cycle to at least one of the even and odd banks of a cache memory device; and synchronously providing the subsequent addresses of the burst read cycle to the even and odd banks of the cache memory.

14. The method of claim 13, wherein the predetermined burst ordering scheme is a Pentium® burst sequence.

15. The method of claim 13, wherein the predetermined burst ordering scheme is a linear burst sequence.

* * * * *